United States Patent
Sharma (10) Patent No.: US 12,277,202 B2
(45) Date of Patent: Apr. 15, 2025

(54) COMPUTER-IMPLEMENTED METHOD AND A VIRTUAL REALITY DEVICE FOR PROVIDING BEHAVIOR-BASED AUTHENTICATION IN VIRTUAL ENVIRONMENT

(71) Applicant: Visa International Service Association, San Francisco, CA (US)

(72) Inventor: Mohit Sharma, Karnataka (IN)

(73) Assignee: Visa International Service Association, San Francisco, CA (US)

( * ) Notice: Subject to any disclaimer, the term of this patent is extended or adjusted under 35 U.S.C. 154(b) by 264 days.

(21) Appl. No.: 17/763,717

(22) PCT Filed: Nov. 1, 2019

(86) PCT No.: PCT/US2019/059338
§ 371 (c)(1),
(2) Date: Mar. 25, 2022

(87) PCT Pub. No.: WO2021/086398
PCT Pub. Date: May 6, 2021

(65) Prior Publication Data
US 2022/0405359 A1 Dec. 22, 2022

(51) Int. Cl.
*G06F 21/31* (2013.01)
*G06F 3/01* (2006.01)
*G06F 3/04815* (2022.01)

(52) U.S. Cl.
CPC .......... *G06F 21/316* (2013.01); *G06F 3/011* (2013.01); *G06F 3/04815* (2013.01)

(58) Field of Classification Search
CPC ........ G06V 20/20; G06V 40/18; G06F 3/011; G06F 3/04815; G06F 21/316
See application file for complete search history.

(56) References Cited

U.S. PATENT DOCUMENTS

| | | | |
|---|---|---|---|
| 8,255,698 B2* | 8/2012 | Li | G06F 21/32 455/433 |
| 8,619,135 B2* | 12/2013 | Shellshear | H04N 7/18 348/135 |
| 8,988,350 B2 | 3/2015 | Karmarkar et al. | |
| 9,465,368 B1 | 10/2016 | Mitter et al. | |
| 10,242,501 B1 | 3/2019 | Pusch et al. | |
| 10,354,252 B1* | 7/2019 | Sahar | G06Q 20/4016 |
| 10,503,964 B1* | 12/2019 | Valgardsson | G06T 19/006 |
| 10,637,872 B2* | 4/2020 | Solow | H04L 63/107 |

(Continued)

*Primary Examiner* — Mohammad A Siddiqi
(74) *Attorney, Agent, or Firm* — The Webb Law Firm (57) ABSTRACT

A method including: capturing or receiving data associated with behavior of a user of a virtual reality device during a session in a virtual environment, wherein the data includes sensory inputs associated with the user from one or more sensors and information associated with user parameters; initiating authentication of the user in the virtual environment; comparing the captured or received data with historic data of the user, wherein the historic data is associated with behavior of the user monitored for a plurality of sessions over a period of time in the virtual environment; determining a score based on the comparison; comparing the score with a predefined threshold score; and in response to determining that the score is above the predefined threshold score, authenticating the user.

20 Claims, 5 Drawing Sheets

(56) References Cited

U.S. PATENT DOCUMENTS

| | | | | |
|---|---|---|---|---|
| 10,832,484 | B1* | 11/2020 | Silverstein | G06F 3/011 |
| 11,138,631 | B1* | 10/2021 | Perevodchikov | G06N 20/20 |
| 2012/0198491 | A1* | 8/2012 | O'Connell | G06F 21/316 |
| | | | | 725/30 |
| 2016/0042179 | A1* | 2/2016 | Weingarten | G06F 21/566 |
| | | | | 726/23 |
| 2017/0093848 | A1* | 3/2017 | Poisner | G06F 3/017 |
| 2018/0299956 | A1* | 10/2018 | Chen | A63F 13/67 |
| 2018/0332072 | A1* | 11/2018 | Ford | H04L 9/3236 |
| 2019/0025587 | A1 | 1/2019 | Osterhout et al. | |
| 2019/0052471 | A1* | 2/2019 | Panattoni | H04L 67/306 |
| 2019/0253883 | A1 | 8/2019 | Aylward et al. | |
| 2020/0066390 | A1* | 2/2020 | Svendrys | G06F 3/0346 |
| 2020/0356136 | A1* | 11/2020 | Aimone | G06F 3/015 |
| 2020/0364779 | A1* | 11/2020 | Wright-Freeman | G06Q 40/06 |
| 2021/0105290 | A1* | 4/2021 | Beauchesne | G06F 21/56 |
| 2021/0134110 | A1* | 5/2021 | Irwin, Jr. | G06F 21/31 |
| 2022/0310247 | A1* | 9/2022 | Freeman | A61B 5/0205 |

* cited by examiner

COMPUTER-IMPLEMENTED METHOD AND A VIRTUAL REALITY DEVICE FOR PROVIDING BEHAVIOR-BASED AUTHENTICATION IN VIRTUAL ENVIRONMENT

CROSS-REFERENCE TO RELATED APPLICATION

This application is the United States national phase of International Application No. PCT/US2019/053338 filed Nov. 1, 2019, the entire disclosure which is hereby incorporated by reference in its entirety.

BACKGROUND

1. Technical Field

The present disclosure relates to the field of virtual reality and, more specifically, behavior-based authentication in virtual environment.

2. Technical Considerations

Over recent past, the field of computer security has evolved along with the changing nature of technology. For instance, today with proliferation of virtual reality and augmented reality devices among users, banks, and payment processing systems require effective payment security in virtual environment.

Generally, for any access to resources such as payment transactions or any other resources in the virtual environment, a user is authenticated by a different method, such as gesture-based authentication, personal identification number (PIN), or pattern-based authentication, and the like. However, such authentication methods in the virtual environment are not very efficient. For example, for a user working in a physical space, a PIN or pattern entry or re-entry during authentication is straightforward and incurs minimal inconvenience. However, during authentication in the virtual environment, the PIN or the pattern may be entered or re-entered by the user within the virtual environment. This may be challenging, and as such an authentication still has a potential to make the PIN or the pattern extremely vulnerable to visual attacks.

Thus, currently there exists no efficient way of utilizing data of users in virtual environment for additional security. Thus, what is needed is a secure and efficient environment for providing authentication in virtual environment.

The information disclosed in this background of the disclosure section is only for enhancement of understanding of the general background of the disclosure and should not be taken as an acknowledgement or any form of suggestion that this information forms existing knowledge.

SUMMARY

In some non-limiting embodiments or aspects, provided is a computer-implemented method comprising: capturing or receiving, with at least one processor, data associated with behavior of a user of a Virtual Reality (VR) device during a session in a virtual environment, wherein the data comprises sensory inputs associated with the user from one or more sensors and information associated with user parameters; initiating, with at least one processor, authentication of the user in the virtual environment; comparing, with at least one processor, the captured or received data with historic data of the user, wherein the historic data is associated with behavior of the user monitored for a plurality of sessions over a period of time in the virtual environment; determining, with at least one processor, a score based on the comparison; comparing, with at least one processor, the score with a predefined threshold score; and in response to determining, with at least one processor, that the score is above the predefined threshold score, authenticating the user.

In some non-limiting embodiments or aspects, the one or more sensors comprise haptic sensors. In some non-limiting embodiments or aspects, the sensory inputs associated with the user comprise at least one of the following: tactile data, eye movement data, brain activity data, or any combination thereof. In some non-limiting embodiments or aspects, the user parameters comprise at least one of the following: reaction of the user at each instance of the session, frequency of following instructions in the virtual environment, pattern of recognizing one or more items in the virtual environment, speed of actions performed by the user, time taken for each action and path followed in the virtual environment, or any combination thereof. In some non-limiting embodiments or aspects, the predefined threshold score is calculated based on the historic data associated with behavior of the user.

In some non-limiting embodiments or aspects, the method further comprises providing, by the VR device, information associated with the authentication to an external system. In some non-limiting embodiments or aspects, the VR device performs at least one of the following steps: capturing or receiving data associated with behavior of a user of the VR device during a session in a virtual environment; initiating authentication of the user in the virtual environment; comparing the captured or received data with historic data of the user; determining a score based on the comparison; comparing the score with a predefined threshold score; authenticating the user; or any combination thereof. In some non-limiting embodiments or aspects, an external system performs at least one of the following steps: capturing or receiving data associated with behavior of a user of the VR device during a session in a virtual environment; initiating authentication of the user in the virtual environment; comparing the captured or received data with historic data of the user; determining a score based on the comparison; comparing the score with a predefined threshold score; authenticating the user; or any combination thereof.

In some non-limiting embodiments or aspects, provided is a system comprising: at least one processor; and a memory communicatively coupled to the processor, wherein the memory stores processor instructions, which, on execution, causes the at least one processor to: capture or receive data associated with behavior of a user of a Virtual Reality (VR) device during a session in a virtual environment, wherein the data comprises sensory inputs associated with the user from one or more sensors and information associated with user parameters; initiate authentication of the user in the virtual environment; compare the captured or received data with historic data of the user, wherein the historic data is associated with behavior of the user monitored for a plurality of sessions over a period of time in the virtual environment; determine, with at least one processor, a score based on the comparison; compare, with at least one processor, the score with a predefined threshold score; and in response to determining, with at least one processor, that the score is above the predefined threshold score, authenticate the user.

In some non-limiting embodiments or aspects, at least one of the steps are executed by at least one of the following: at least one processor of the VR device, at least one processor of an external system, or any combination thereof. In some non-limiting embodiments or aspects, the one or more sensors comprise haptic sensors. In some non-limiting embodiments or aspects, the sensory inputs associated with the user comprise at least one of the following: tactile data, eye movement data, brain activity data, or any combination thereof. In some non-limiting embodiments or aspects, the user parameters comprise at least one of the following: reaction of the user at each instance of the session, frequency of following instructions in the virtual environment, pattern of recognizing one or more items in the virtual environment, speed of actions performed by the user, time taken for each action and path followed in the virtual environment, or any combination thereof. In some non-limiting embodiments or aspects, the processor calculates the predefined threshold score based on the historic data associated with behavior of the user.

In some non-limiting embodiments or aspects, provided is a Virtual Reality (VR) device comprising: at least one processor; and a memory communicatively coupled to the processor, wherein the memory stores processor instructions, which, on execution, causes the at least one processor to: capture data associated with behavior of a user during a session in a virtual environment, wherein the data comprises sensory inputs associated with the user from one or more sensors and information associated with user parameters; initiate authentication of the user in the virtual environment by: comparing the captured data with historic data of the user, wherein the historic data is associated with behavior of the user monitored for a plurality of sessions over a period of time in the virtual environment; calculating a score based on the comparison, wherein the score is compared with a predefined threshold score; and in response to determining that the score is above the predefined threshold score, authenticate the user.

In some non-limiting embodiments or aspects, the one or more sensors comprise haptic sensors. In some non-limiting embodiments or aspects, the sensory inputs associated with the user comprise at least one of the following: tactile data, eye movement data, brain activity data, or any combination thereof. In some non-limiting embodiments or aspects, the user parameters comprise at least one of the following: reaction of the user at each instance of the session, frequency of following instructions in the virtual environment, pattern of recognizing one or more items in the virtual environment, speed of actions performed by the user, time taken for each action and path followed in the virtual environment, or any combination thereof. In some non-limiting embodiments or aspects, the at least one processor calculates the predefined threshold score based on the historic data associated with behavior of the user. In some non-limiting embodiments or aspects, the at least one processor provides information regarding authentication to an external system.

Further non-limiting embodiments or aspects are set forth in the following numbered clauses.

Clause 1: A computer-implemented method comprising: capturing or receiving, with at least one processor, data associated with behavior of a user of a Virtual Reality (VR) device during a session in a virtual environment, wherein the data comprises sensory inputs associated with the user from one or more sensors and information associated with user parameters; initiating, with at least one processor, authentication of the user in the virtual environment; comparing, with at least one processor, the captured or received data with historic data of the user, wherein the historic data is associated with behavior of the user monitored for a plurality of sessions over a period of time in the virtual environment; determining, with at least one processor, a score based on the comparison; comparing, with at least one processor, the score with a predefined threshold score; and in response to determining, with at least one processor, that the score is above the predefined threshold score, authenticating the user.

Clause 2: The computer-implemented method of clause 1, wherein the one or more sensors comprise haptic sensors.

Clause 3: The computer-implemented method of clause 1 or 2, wherein the sensory inputs associated with the user comprise at least one of the following: tactile data, eye movement data, brain activity data, or any combination thereof.

Clause 4: The computer-implemented method of any of clauses 1-3, wherein the user parameters comprise at least one of the following: reaction of the user at each instance of the session, frequency of following instructions in the virtual environment, pattern of recognizing one or more items in the virtual environment, speed of actions performed by the user, time taken for each action and path followed in the virtual environment, or any combination thereof.

Clause 5: The computer-implemented method of any of clauses 1-4, wherein the predefined threshold score is calculated based on the historic data associated with behavior of the user.

Clause 6: The computer-implemented method of any of clauses 1-5, further comprising providing, by the VR device, information associated with the authentication to an external system.

Clause 7: The computer-implemented method of any of clauses 1-6, wherein the VR device performs at least one of the following steps: capturing or receiving data associated with behavior of a user of the VR device during a session in a virtual environment; initiating authentication of the user in the virtual environment; comparing the captured or received data with historic data of the user; determining a score based on the comparison; comparing the score with a predefined threshold score; authenticating the user; or any combination thereof.

Clause 8: The computer-implemented method of any of clauses 1-7, wherein an external system performs at least one of the following steps: capturing or receiving data associated with behavior of a user of the VR device during a session in a virtual environment; initiating authentication of the user in the virtual environment; comparing the captured or received data with historic data of the user; determining a score based on the comparison; comparing the score with a predefined threshold score; authenticating the user; or any combination thereof.

Clause 9: A system comprising: at least one processor; and a memory communicatively coupled to the processor, wherein the memory stores processor instructions, which, on execution, causes the at least one processor to: capture or receive data associated with behavior of a user of a Virtual Reality (VR) device during a session in a virtual environment, wherein the data comprises sensory inputs associated with the user from one or more sensors and information associated with user parameters; initiate authentication of the user in the virtual environment; compare the captured or received data with historic data of the user, wherein the historic data is associated with behavior of the user monitored for a plurality of sessions over a period of time in the virtual environment; determine, with at least one processor, a score based on the comparison; compare, with at least one processor, the score with a predefined threshold score; and in response to determining, with at least one processor, that the score is above the predefined threshold score, authenticate the user.

Clause 10: The system of clause 9, wherein at least one of the steps is executed by at least one of the following: at least one processor of the VR device, at least one processor of an external system, or any combination thereof.

Clause 11: The system of clause 9 or 10, wherein the one or more sensors comprise haptic sensors.

Clause 12: The system of any of clauses 9-11, wherein the sensory inputs associated with the user comprise at least one of the following: tactile data, eye movement data, brain activity data, or any combination thereof.

Clause 13: The system of any of clauses 9-12, wherein the user parameters comprise at least one of the following: reaction of the user at each instance of the session, frequency of following instructions in the virtual environment, pattern of recognizing one or more items in the virtual environment, speed of actions performed by the user, time taken for each action and path followed in the virtual environment, or any combination thereof.

Clause 14: The system of any of clauses 9-13, wherein the processor calculates the predefined threshold score based on the historic data associated with behavior of the user.

Clause 15: A Virtual Reality (VR) device comprising: at least one processor; and a memory communicatively coupled to the processor, wherein the memory stores processor instructions, which, on execution, causes the at least one processor to: capture data associated with behavior of a user during a session in a virtual environment, wherein the data comprises sensory inputs associated with the user from one or more sensors and information associated with user parameters; initiate authentication of the user in the virtual environment by: comparing the captured data with historic data of the user, wherein the historic data is associated with behavior of the user monitored for a plurality of sessions over a period of time in the virtual environment; and calculating a score based on the comparison, wherein the score is compared with a predefined threshold score; and in response to determining that the score is above the predefined threshold score, authenticate the user.

Clause 16: The VR device of clause 15, wherein the one or more sensors comprise haptic sensors.

Clause 17: The VR device of clause 15 or 16, wherein the sensory inputs associated with the user comprise at least one of the following: tactile data, eye movement data, brain activity data, or any combination thereof.

Clause 18: The VR device of any of clauses 15-17, wherein the user parameters comprise at least one of the following: reaction of the user at each instance of the session, frequency of following instructions in the virtual environment, pattern of recognizing one or more items in the virtual environment, speed of actions performed by the user, time taken for each action and path followed in the virtual environment, or any combination thereof.

Clause 19: The VR device of any of clauses 15-18, wherein the at least one processor calculates the predefined threshold score based on the historic data associated with behavior of the user.

Clause 20: The VR device of any of clauses 15-19, wherein the at least one processor provides information regarding authentication to an external system.

Disclosed herein is a computer-implemented method for providing behavior-based authentication in virtual environment. In some non-limiting embodiments or aspects, the method may include capturing data associated with behavior of a user during a session in the virtual environment. The data comprises sensory inputs associated with the user from one or more sensors and information associated with user parameters. The method includes initiating authentication of the user in the virtual environment. The authentication is initiated by comparing the captured data with historic data of the user. The historic data is associated with behavior of the user which may be monitored for a plurality of sessions over a period of time in the virtual environment. Based on the comparison, the method includes calculating a score which is compared with a predefined threshold score. Thereafter, the method includes authenticating the user based on the score. The user is authenticated when the score is above the predefined threshold score.

Further, the present disclosure includes a Virtual Reality (VR) device for providing behavior-based authentication in virtual environment. In some non-limiting embodiments or aspects, the VR device includes a processor and a memory communicatively coupled to the processor. The memory stores processor instructions, which, on execution, causes the processor to capture data associated with behavior of a user during a session in the virtual environment. The data comprises sensory inputs associated with the user from one or more sensors and information associated with user parameters. Upon capturing the data, the VR device initiates authentication of the user in the virtual environment. The authentication is performed by comparing the captured data with historic data of the user. The historic data is associated with behavior of the user monitored during a plurality of sessions over a period of time in the virtual environment. Further, the VR device calculates a score based on the comparison. The score is compared with a predefined threshold score. Thereafter, the VR device authenticates the user based on the score, wherein the user is authenticated when the score is above the predefined threshold score.

The foregoing summary is illustrative only and is not intended to be in any way limiting. In addition to the illustrative aspects, embodiments, and features described above, further aspects, embodiments, and features may become apparent by reference to the drawings and the following detailed description. Additional features and advantages are realized through the techniques of the present disclosure. Other embodiments and aspects of the disclosure are described in detail herein and are considered a part of the claimed disclosure.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer-readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes", "including", or any other variations thereof are intended to cover a non-exclusive inclusion, such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a computer-implemented method and a Virtual Reality (VR) device for providing behavior-based authentication in virtual environment. With advancement in computer technology, virtual reality devices have gained huge importance in multiple domains such as education, advertisement, shopping, and the like. Generally, for any access to resources such as payment transaction or any other resources in the virtual environment, the user is authenticated by different method such as gesture-based authentication, PIN, or pattern-based authentication and the like. However, such authentication methods in the virtual environment are not very efficient. For example, for a user working in a physical space, a PIN or pattern entry or re-entry during authentication is straightforward and incurs minimal inconvenience. However, during authentication in the virtual environment, the PIN or the pattern may be entered or re-entered by the user within the virtual environment. This may be challenging as such an authentication still has a potential to make the PIN or the pattern extremely vulnerable to visual attacks.

Thus, the present disclosure involves the VR device for providing behavior-based authentication in virtual environment. The VR device is a dedicated device associated with users for experiencing and interacting with a simulated environment. The present disclosure executes authentication of the users in the virtual environment by making use of behavioral patterns exhibited by the users while traversing the virtual environment. The behavioral patterns of the users recorded in real-time may be compared with historic data associated with behavior of the users. Based on the comparison, a score may be generated which may be compared against a predefined threshold score. Thus, if the score calculated in real-time is above the predefined threshold score, the users may be authenticated in the virtual environment.

Non-limiting embodiments or aspects of the present disclosure have several advantages. For example, embodiments improve security for critical processes carried out in the virtual environment. Furthermore, non-limiting embodiments or aspects of the present disclosure are more convenient to users because the authentication is performed based on behavioral patterns, and the users do not face the inconvenience of entering and re-entering of a PIN, patterns, or passwords. Accordingly, non-limiting embodiments or aspects of the present disclosure provide a more secure and convenient method for user authentication in virtual environment.

Figure 1:
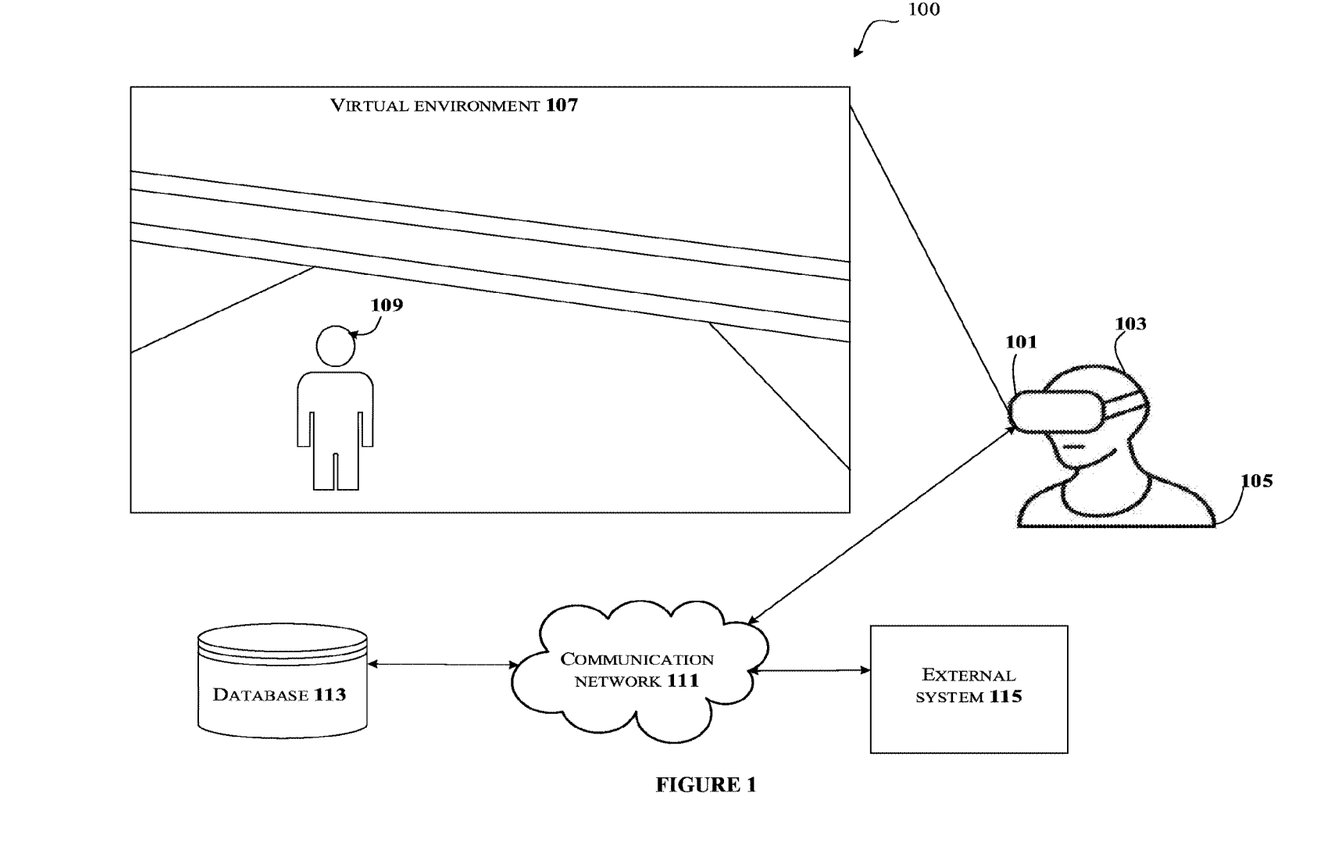
FIG. 1 shows an exemplary environment for providing behavior-based authentication in virtual environment, in accordance with some non-limiting embodiments or aspects of the present disclosure.

FIG. 1 shows an exemplary environment for providing behavior-based authentication in virtual environment, in accordance with some non-limiting embodiments or aspects of the present disclosure. As shown in FIG. 1, an environment 100 includes a Virtual Reality (VR) device 101 associated with a physical user 103. In some implementations, the physical user 103 is equipped with the VR device 101 and VR equipment, such as a haptic suit 105. Additionally, the physical user 103 may be equipped with other VR equipment, such as hand gear, haptic gloves, and the like. The physical user 103 is capable of interacting with the VR device 101 using, for example, a joystick, voice commands, and the like. In some non-limiting embodiments or aspects, the VR device 101 includes a display unit (not shown explicitly in FIG. 1) for rendering a virtual environment 107 to the physical user 103.

The virtual environment 107 is an interactive computer-generated experience taking place within a simulated environment rendered to the physical user 103 using the VR device 101. The virtual environment 107 includes a virtual user 109 corresponding to the physical user 103. The virtual user 109 is a program that performs actions like a real user based on the inputs from the physical user 103. The virtual user 109 is a representation of the physical user 103 in the virtual environment 107. The virtual user 109 may navigate in the virtual environment 107 and perform one or more actions in one or more establishments, for example, virtual shops like a restaurant, a virtual reality game, a mall, and the like, present in the virtual environment 107. Further, the physical user 103 can initiate a payment for a transaction in such establishments.

Further, the VR device 101 may be communicably connected through a communication network 111 to a database 113 and an external system 115. In some non-limiting embodiments or aspects, the external system 115 may include, but is not limited to, a desktop computer, a personal digital assistant (PDA), a notebook, a smartphone, a tablet, and any other computing devices. It should be understood that any other external device 115 for communication with the VR device 101, not mentioned explicitly, may also be used in the present disclosure. In some non-limiting embodiments or aspects, the communication network 111 may include, for example, a direct interconnection, an e-commerce network, a peer to peer (P2P) network, local area network (LAN), wide area network (WAN), wireless network (e.g., using Wireless Application Protocol), the Internet, Wi-Fi®, cellular network, and the like.

Initially, the VR device 101 may monitor behavior of the virtual user 109 corresponding to the physical user 103 in the virtual environment 107 for a plurality of sessions initiated by the physical user 103 for different establishments. In some non-limiting embodiments or aspects, a session may relate to an activity, such as playing games, shopping, and the like, performed for a time period by the physical user 103 in the virtual environment 107. Based on the monitoring, the VR device 101 may store parameters associated with the behavior of the physical user 103 as historic data. For example, the parameters may be in the form of unstructured data, which can be stored in the database, such as, for example, NoSQL Databases in JSON or key-value pairs format.

In some non-limiting embodiments or aspects, the VR device 101 may generate a behavioral model using machine learning techniques. In some non-limiting embodiments or aspects, the VR device 101 may use models, for example DNN (Deep Neural Network), RNN (Recurrent Neural Network), and the like. It should be understood that any other models of machine learning can be used for generating the behavioral model in the present disclosure. In some non-limiting embodiments or aspects, based on nature of the establishment, different behavioral models may be generated for the physical user 103. The behavioral model may be trained using the historic data associated with the physical user 103.

In one exemplary embodiment, a virtual session is initiated by the physical user 103 in the virtual environment 107, as represented by the virtual user 109 and as shown in FIG. 1. In such a case, while the virtual user 109 moves in the virtual environment 107, the VR device 101 may capture data associated with behavior of the virtual user 109. In some non-limiting embodiments or aspects, the data associated with the behavior may define every movement and action performed by the virtual user 109 in the virtual environment 107.

In some non-limiting embodiments or aspects, the data may include sensory inputs associated with the virtual user 109 and information associated with user parameters. The sensory inputs may be received from the one or more sensors configured in the VR equipment. For example, the one or more sensors may include haptic sensors. The haptic sensors may recreate a sense of touch by creating a combination of force, vibration, and motion sensations to the physical user 103. It should be understood that any other sensor, used as an alternative to the haptic sensors, may also be used in the present disclosure. Apart from using a combination of force, vibration, and motions, haptic sensors may use a force feedback loop to manipulate movement of the physical user 103. Typically, the basic principle of a haptic sensor is generation of an electric current that drives a response to create a vibration.

The sensory inputs associated with the physical user 103 may include, but is not limited to, tactile data, eye movement data, and/or activities associated with the brain of the physical user 103, such as brain imaging data. Further, the user parameters may include, but are not limited to, reaction of the virtual user 109 at each instance of the session, frequency of following instructions in the virtual environment 107, pattern of recognizing one or more items in the virtual environment 107, speed of actions performed by the virtual user 109, time taken for each action and path followed in the virtual environment 107, or any combination thereof. For example, if the physical user 103 is in the mall represented using the virtual environment 107 and is moving to different stores in the mall, the VR device 101 may store different movement patterns in the mall. In another example, a physical user 103 may enter a virtual house, the physical user 103 may be following a pattern of entering a drawing room and leaving vehicle keys on a table, and moving to a gaming room.

After capturing the data, the VR device 101 may initiate authentication of the physical user 103 in the virtual environment 107. For authentication, the VR device 101 may compare the captured data with the historic data of the physical user 103. In some non-limiting embodiments or aspects, the VR device 101 may compare by passing the captured data through associated behavioral model. For example, if the session is initiated for the mall, the behavioral model associated with the mall may be initiated for comparing the behavior of the physical user 103 in the virtual environment 107. In some non-limiting embodiments or aspects, the captured data in the form of signals, waveforms, collection of coordinates, metrics, and the like of devices of physical user 103 can be normalized and mapped to text forms. The text form is fed to the machine learning behavioral model for providing a score for the captured data.

Thus, based on the comparison, the VR device 101 may calculate a score using the behavioral model, which may be compared with a predefined threshold score. In some non-limiting embodiments or aspects, the score is derived from the behavioral model based on features matching in current action of the virtual user 109 (transformed text for user action). In some non-limiting embodiments or aspects, the initiation, comparison, and/or score steps may be implemented external to the VR device 101. In some non-limiting embodiments or aspects, the predefined threshold score is calculated based on the historic data associated with behavior of the physical user 103. In some non-limiting embodiments or aspects, the threshold score can be fixed based on the requirement of organization associated with the VR device 101 and stability of the machine learning model. For instance, if the behavioral model is selected as DNN, in such case, though large number of layers in DNN may provide efficiency until some point but such large number of layers may also increase overall time for processing. Thus, as the data is passed to the DNN, it may accumulate addition and penalty to the scores, which can be compared to a threshold score (for example, a threshold score is 80 where the score can be between 0-100). Further, in some non-limiting embodiments or aspects, the behavioral model may include a combination of DNN and structured prediction network, which may add or penalize a score for the captured data. Thus, based on the score, the VR device 101 may authenticate the virtual user 109 in the virtual environment 107. For instance, the virtual user 109 is authenticated when the score is above the predefined threshold score.

Figure 2:
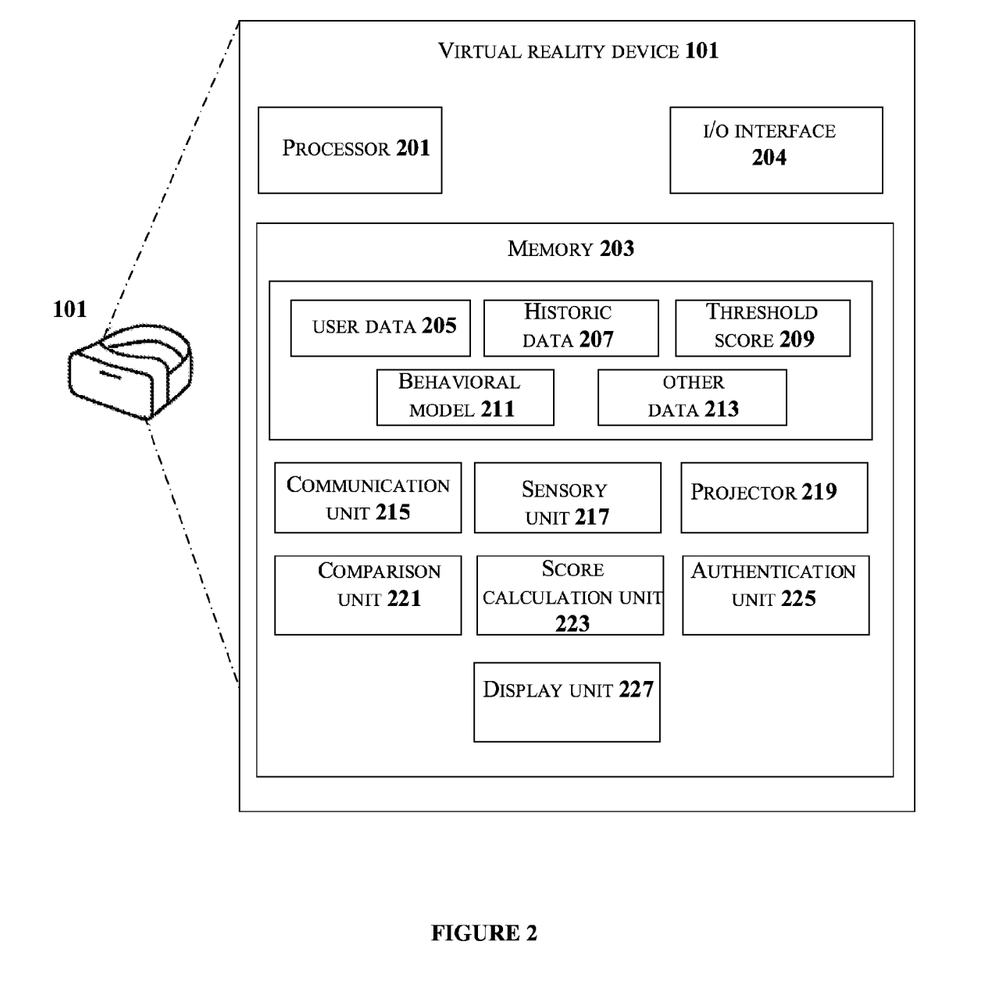
FIG. 2 shows an exemplary detailed block diagram of a virtual reality device, in accordance with some non-limiting embodiments or aspects of the present disclosure.
Figure 3:
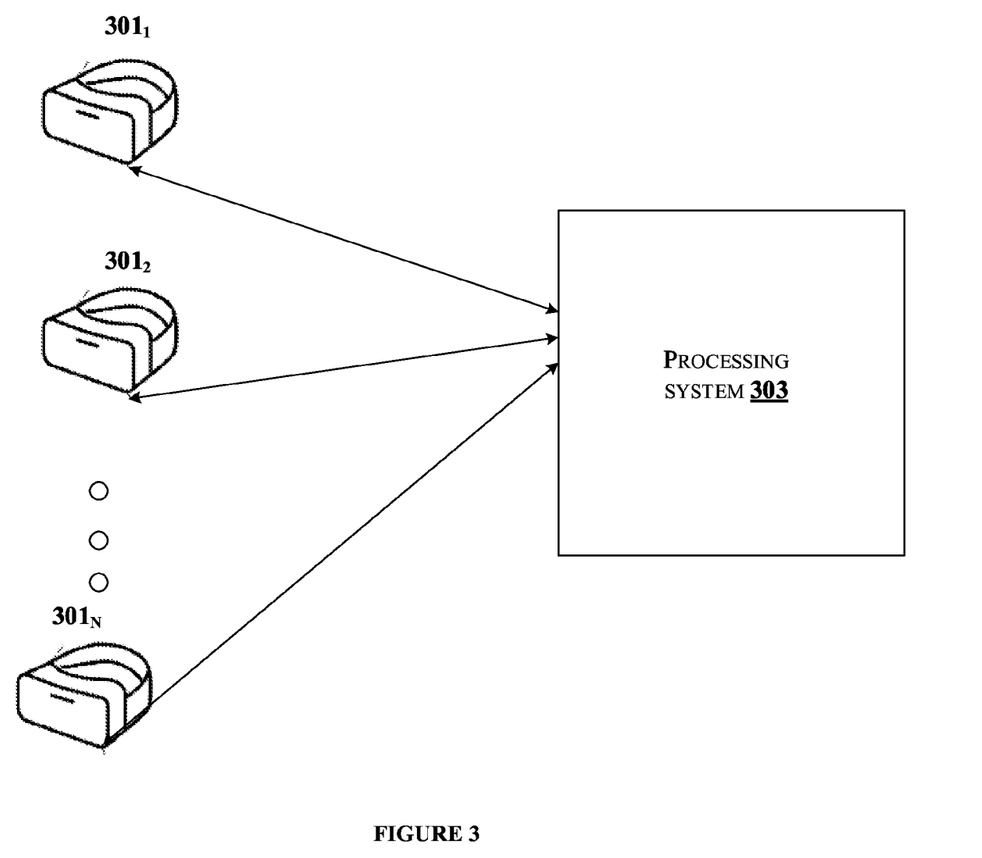
FIG. 3 shows an exemplary embodiment of a virtual reality device, in accordance with some non-limiting embodiments or aspects of the present disclosure.

FIG. 2 shows an exemplary detailed block diagram of a virtual reality device, in accordance with non-limiting embodiments or aspects of the present disclosure. As shown in FIG. 2, the VR device 101 may include at least a processor 201 and a memory 203 for storing instructions executable by the processor 201. The processor 201 may comprise at least one data processor for executing program components for executing user or system-generated requests. The memory 203 is communicatively coupled to the processor 201. The VR device 101 further comprises an Input/Output (I/O) interface 204. The I/O interface 204 is coupled with the processor 201 through which an input signal or/and an output signal is communicated. In some non-limiting embodiments or aspects, the VR device 101 and the processor 201 can be considered as a single unit. FIG. 3 shows an exemplary embodiment of a plurality of VR devices (3011, 3012, ... 301N) connected with a processing system 303. For example, a vendor can manufacture the VR device 101 such that the processor 201 for authenticating the physical user 103 is configured within the VR device 101.

Alternatively, the VR device 301 and the processing system 303 can be independent, such that each VR device 301 can be communicatively coupled with the processing system 303. In an example embodiment, consider an interactive virtual tour scenario. The VR device 101 may be configured with a virtual environment 107 having a plurality of monuments in the tour. The physical user 103 in such case may use the VR device 101 to virtually explore the monuments using the virtual environment 107.

While exploring, the VR device 101 may capture the data related to the physical user 103 such as angles of eye gaze and patterns formed by gaze movements. The gaze movements may be related to drawing lines in air. Further, the VR device 101 may capture data such as time spent for staring an object in the tour, area of details such as always looking at a statue first followed by reading description under the statue, and sensory inputs from haptic suit 105. The sensory inputs may include frequency of pointing gaze of things that are not in front, pattern of following VR instructions, pattern of movement of hand, preferred hand, a preferred way of exploring a place through left or right movement, an accepted deviation from mean time taken to complete a tour, or any combination thereof. For example, both "19 minutes and 5 minutes" tours may be mapped on a scale from "0 to 1" to measure the mean.

In some non-limiting embodiments or aspects, the data stored in the memory 203 may include user data 205, historic data 207, a threshold score 209, a behavioral model 211, and other data 213. The user data 205 may include details of behavior of the physical user 103 captured during the session. The details may include sensory inputs and the user parameters. In some non-limiting embodiments or aspects, the sensory inputs include the one or more signals received from the one or more sensors configured at different virtual equipment. The sensory inputs may include the tactile (e.g., touch sensations) data, eye movement (or tracking) data, and activities associated with the brain of the physical user 103. The user parameters may include the reaction of the user at each instance of the session, frequency of following instructions in the virtual environment 107, a pattern of recognizing one or more items in the virtual environment 107, speed of actions performed by the physical user 103, time taken for each action, path followed in the virtual environment 107, or any combination thereof.

The historic data 207 may include the data monitored for the plurality of sessions initiated by the physical user 103 in the past for different establishments. In some non-limiting embodiments or aspects, the historic data 207 may be stored in the database 113. The threshold score 209 may include the predefined threshold score generated for the physical user 103 for the different virtual establishments. The behavioral model 211 may include the behavioral model generated for the different virtual establishments using the machine learning techniques. In some non-limiting embodiments or aspects, other data 213 may include the virtual environment 107 information which includes details regarding positions of the establishments in the virtual environment 107 or the position of specific objects in the virtual environment 107.

In some non-limiting embodiments or aspects, the VR device 101 may include a communication unit 215, a sensory unit 217, a projector 219, a comparison unit 221, a score calculation unit 223, an authentication unit 225, and a display unit 227. The communication unit 215 is housed on the VR device 101 and is responsible for receiving information from the one or more sensors associated with the VR device 101. Further, the communication unit 215 may be responsible for sending and receiving information from the external system 115. The communication unit 215 may include a wired or wireless interface for communicating with the one or more sensors associated with the VR device 101.

The sensory unit 217 may be housed on the VR device 101 or present external to the VR device 101 and communicatively coupled to the processor 201. The sensory unit 217 may include one or more sensors associated with the VR device 101. Additionally, the sensory unit 217 may receive inputs from other sensors configured at different virtual equipment. Examples of the one or more sensors include haptic sensors, an image capturing unit, a microphone, an eye tracking sensor, a motion tracking sensor, an infrared sensor, a joystick, a game controller, and a head motion tracking sensor. The projector 219 is housed on the VR device 101 and communicatively coupled to the processor 201. The projector 219 is used to project the virtual environment 107 on to the display unit 227 of the VR device 101.

The comparison unit 221 may compare the data captured during the session in the virtual environment 107 with historic data associated with the physical user 103. In some non-limiting embodiments or aspects, the comparison may be performed external to the VR device 101. In such case, the external system 115 may contain the historic data. The external system 115 may receive the captured data from the VR device 101 and compare with the historic data, with the result of the comparison communicated to the VR device 101.

The score calculation unit 223 may calculate the score based on the comparison. In some non-limiting embodiments or aspects, the score may indicate a confidence level of the physical user 103 being the actual authorized user. The score calculation unit 223 may compare the calculated score with the predefined threshold value. In some non-limiting embodiments or aspects, the calculation of the score may be performed external to the VR device 101. In such case, the VR device 101 may receive the calculated score from the external system 115 for comparing with the predefined threshold value. In some non-limiting embodiments or aspects, the comparison of the score with the predefined threshold value may be performed external to the VR device 101.

The authentication unit 225 may authenticate the physical user 103 based on the comparison. For instance, if the score is greater than the predefined threshold score, the physical user 103 is authenticated in the virtual environment 107. For instance, in a virtual reality game played by the virtual user 109, the predefined threshold score is set as "80". In order to buy additional points, the virtual user 109 requires authentication. The data for the virtual user 109 is captured during the virtual reality game and the score is calculated. If the score calculated during the game for the virtual user 109 is "90", the virtual user 109 is authenticated for buying additional points. Alternatively, if the score is less than the predefined threshold score, the physical user 103 is not authenticated. For instance, consider, in the same virtual reality game played by the virtual user 109, the predefined threshold score is set as "80". In order to buy additional points, the virtual user 109 requires authentication. The data for the virtual user 109 is captured during the virtual reality game and the score is calculated. If the score calculated during the game for the virtual user 109 is "75", the virtual user 109 is not authenticated for buying additional points. In some non-limiting embodiments or aspects, the authentication may be performed external to the VR device 101 and result of the authentication may be communicated to the VR device 101 for further processing and actions. The display unit 227 is housed in the VR device 101 and communicatively coupled to the processor 201. The display unit 227 displays the virtual environment 107 projected by the projector 219 to the physical user 103. In some non-limiting embodiments or aspects, the display unit 227 can be a flat display or a curved display.

Figure 4:
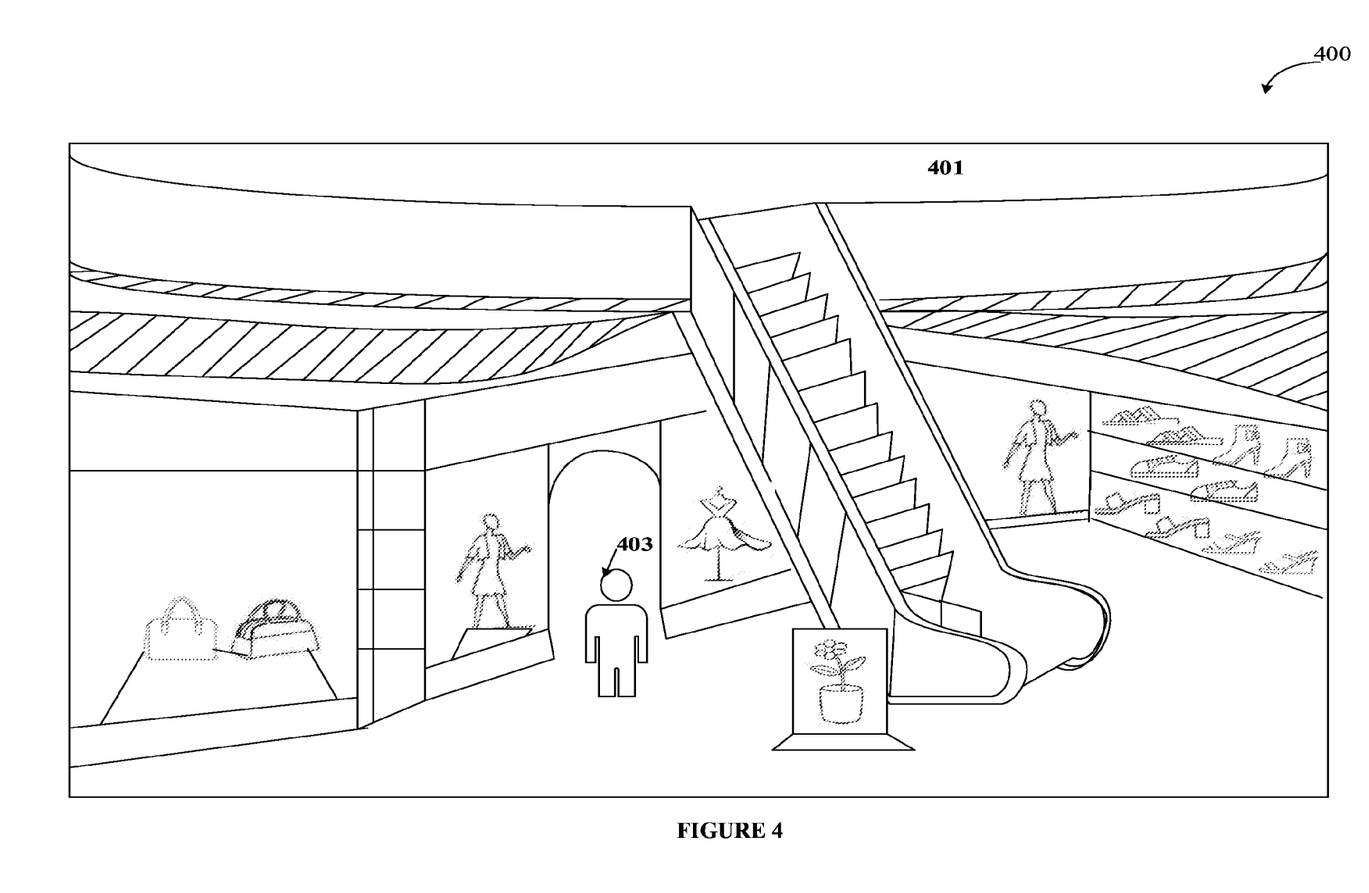
FIG. 4 shows an exemplary scenario of providing behavior-based authentication, in accordance with some non-limiting embodiments or aspects of the present disclosure.

FIG. 4 shows an exemplary scenario of providing behavior-based authentication, in accordance with some non-limiting embodiments or aspects of the present disclosure. Referring now to FIG. 4, an exemplary representation 400 of a virtual mall 401 is illustrated for providing behavioral based authentication. The exemplary representation 400 includes the virtual mall 401 which includes a virtual user 403 associated with the physical user 103 (not shown explicitly). The physical user 103 may be equipped with the VR device 101. It should be understood that FIG. 4 is an exemplary embodiment and the present disclosure may also include other types of virtual establishments. Once the virtual user 403 is in the virtual mall 401, the VR device 101 may capture behavioral data from different sensors, such as sensors in haptic suit 105. While the virtual user 403 moves in the virtual mall 401, the VR device 101 may capture the data, such as preferred entry points used by the virtual user 403 to the virtual mall 401. For instance, the virtual user 403 may always prefer a ground floor entry point. Further, for example, if the virtual user 403 purchases any item, the VR device 101 may capture the pattern of buying items, such as category selection and then item selection, time taken between a state, for example, when the virtual user 403 approaches an item until taking it, angles of eye gaze, and the like.

Further, in the virtual mall 401, the VR device 101 may capture information regarding shops of interest within the virtual mall 401 and path followed to move among them, time spent on each item, pattern of movement of hand and preferred hand, and the like. The data captured for the virtual user 403 is compared with historic data. For instance, consider that the virtual user 403 entered the ground floor for entry into the virtual mall 401 and followed a pattern of going to shop 1 and followed by shop 3 in the ground floor. This pattern of the virtual user 403 is compared with the historic data. Based on the comparison, the VR device 101 may calculate a score for the virtual user 403. For example, out of ten, nine patterns of the virtual user 403 matched with the historic data of the physical user 103. In such case, the VR device 101 may compare the score with the predefined threshold score associated with the virtual mall environment. Consider, the predefined threshold score for the virtual mall environment is 80. In such case, if the virtual user 403 proceeds for the payment transaction, the VR device 101 may authenticate the virtual user 403 in the virtual mall 401.

Figure 5:
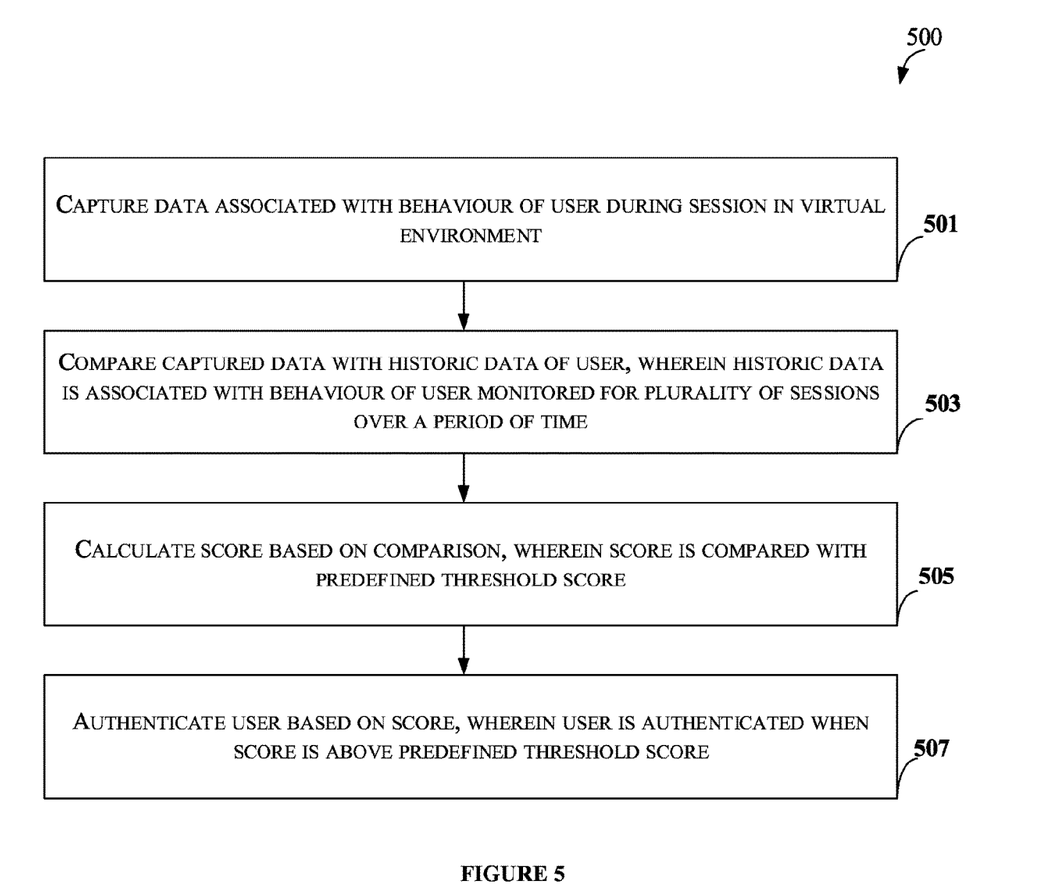
FIG. 5 shows a flow chart illustrating method steps for providing behavior-based authentication in virtual environment, in accordance with some non-limiting embodiments or aspects of the present disclosure.

FIG. 5 shows a flow chart 500 illustrating method steps for providing behavior-based authentication in virtual environment, in accordance with some non-limiting embodiments or aspects of the present disclosure. The order in which the method is described is not intended to be construed as a limitation, and any number of the described method blocks may be combined in any order to implement the method. Additionally, individual blocks may be deleted from the method without departing from the spirit and scope of the subject matter described herein. Furthermore, the method may be implemented in any suitable hardware, software, firmware, or combination thereof.

At block 501, the sensory unit 217 may capture the data associated with behavior of the physical user 103 during the session in the virtual environment 107. In some non-limiting embodiments or aspects, the data includes the sensory inputs associated with the physical user 103 from the one or more sensors and information associated with the user parameters. At block 503, the comparison unit 221 may compare the captured data with the historic data of the physical user 103. The historic data is associated with the behavior of the physical user 103 monitored for the plurality of sessions over the period of time in the virtual environment 107. At block 505, the score calculation unit 223 may calculate the score based on the comparison. The score is compared with the predefined threshold score. At block 507, the authentication unit 225 may authenticate the physical user 103 based on the score. The authentication unit 225 authenticates the physical user 103 when the score is above the predefined threshold score.

As noted above, any of the method steps described above may be performed by, executed by, or implemented on the VR device 101, an associated processor 303, an external system 115, and the like.

The illustrated operation of FIG. 5 shows certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The computer-implemented method for providing behavioral based authentication can be applied to either one of VR, Augmented Reality (AR) and Mixed Reality (MR) environment, where given user behavior in either one of them can be leveraged to provide better security posture to any system which is enabled by authentication. Further, the present disclosure helps users in developing better trust into a virtual point of sale.

A description of an embodiment with several components in communication with each other does not imply that all such components are required. On the contrary a variety of optional components is described to illustrate the wide variety of possible embodiments of the disclosure. The method steps and operations discussed herein may describe certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
    capturing or receiving, with at least one processor, data associated with behavior of a user of a Virtual Reality (VR) device during a plurality of past sessions in a virtual environment to form historic data of the user;
    capturing or receiving, with at least one processor, data associated with behavior of a user of the VR device during a current session in a virtual environment, wherein the data comprises sensory inputs associated with the user from one or more sensors and information associated with user parameters;
    initiating, with at least one processor, authentication of the user in the virtual environment;

comparing, with at least one processor, the captured or received data of the current session with the historic data of the user by passing the captured or received data of the current session through an associated behavioral model;

determining, with at least one processor, a score using the behavioral model based on the comparison;

comparing, with at least one processor, the score with a predefined threshold score; and in response to determining, with at least one processor, that the score is above the predefined threshold score, authenticating the user.

2. The computer-implemented method of claim 1, wherein the one or more sensors comprise haptic sensors.

3. The computer-implemented method of claim 1, wherein the sensory inputs associated with the user comprise at least one of the following: tactile data, eye movement data, brain activity data, or any combination thereof.

4. The computer-implemented method of claim 1, wherein the user parameters comprise at least one of the following: reaction of the user at each instance of the session, frequency of following instructions in the virtual environment, pattern of recognizing one or more items in the virtual environment, speed of actions performed by the user, time taken for each action and path followed in the virtual environment, or any combination thereof.

5. The computer-implemented method of claim 1, wherein the predefined threshold score is calculated based on the historic data associated with behavior of the user.

6. The computer-implemented method of claim 1, further comprising providing, by the VR device, information associated with the authentication to an external system.

7. The computer-implemented method of claim 1, wherein the VR device performs at least one of the following steps:
  capturing or receiving data associated with behavior of a user of the VR device during a session in a virtual environment;
  initiating authentication of the user in the virtual environment;
  comparing the captured or received data with historic data of the user;
  determining a score based on the comparison;
  comparing the score with a predefined threshold score;
  authenticating the user; or
  any combination thereof.

8. The computer-implemented method of claim 1, wherein an external system performs at least one of the following steps:
  capturing or receiving data associated with behavior of a user of the VR device during a session in a virtual environment;
  initiating authentication of the user in the virtual environment;
  comparing the captured or received data with historic data of the user;
  determining a score based on the comparison;
  comparing the score with a predefined threshold score;
  authenticating the user; or
  any combination thereof.

9. A system comprising:
  at least one processor; and
  a memory communicatively coupled to the processor, wherein the memory stores processor instructions, which, on execution, causes the at least one processor to:
    capture or receive data associated with behavior of a user of a Virtual Reality (VR) device during a plurality of past sessions in a virtual environment to form historic data of the user,
    capture or receive data associated with behavior of a user of the VR device during a current session in a virtual environment, wherein the data comprises sensory inputs associated with the user from one or more sensors and information associated with user parameters;
    initiate authentication of the user in the virtual environment;
    compare the captured or received data of the current session with the historic data of the user by passing the captured or received data of the current session through an associated behavioral model;
    determine, with at least one processor, a score using the behavioral model based on the comparison;
    compare, with at least one processor, the score with a predefined threshold score; and
    in response to determining, with at least one processor, that the score is above the predefined threshold score, authenticate the user.

10. The system of claim 9, wherein at least one of the steps is executed by at least one of the following: at least one processor of the VR device, at least one processor of an external system, or any combination thereof.

11. The system of claim 9, wherein the one or more sensors comprise haptic sensors.

12. The system of claim 9, wherein the sensory inputs associated with the user comprise at least one of the following: tactile data, eye movement data, brain activity data, or any combination thereof.

13. The system of claim 9, wherein the user parameters comprise at least one of the following: reaction of the user at each instance of the session, frequency of following instructions in the virtual environment, pattern of recognizing one or more items in the virtual environment, speed of actions performed by the user, time taken for each action and path followed in the virtual environment, or any combination thereof.

14. The system of claim 9, wherein the processor calculates the predefined threshold score based on the historic data associated with behavior of the user.

15. A Virtual Reality (VR) device comprising:
  at least one processor; and
  a memory communicatively coupled to the processor, wherein the memory stores processor instructions, which, on execution, causes the at least one processor to:
    capture or receive data associated with behavior of a user during a plurality of past sessions in a virtual environment to form historic data of the user,
    capture data associated with behavior of a user during a current session in a virtual environment, wherein the data comprises sensory inputs associated with the user from one or more sensors and information associated with user parameters;
    initiate authentication of the user in the virtual environment by:
      comparing the captured data of the current session with the historic data of the user by passing the captured data of the current session through an associated behavioral model; and
      calculating a score using the behavioral model based on the comparison, wherein the score is compared with a predefined threshold score; and in response to determining that the score is above the predefined threshold score, authenticate the user.

16. The VR device of claim 15, wherein the one or more sensors comprise haptic sensors.

17. The VR device of claim 15, wherein the sensory inputs associated with the user comprise at least one of the following: tactile data, eye movement data, brain activity data, or any combination thereof.

18. The VR device of claim 15, wherein the user parameters comprise at least one of the following: reaction of the user at each instance of the session, frequency of following instructions in the virtual environment, pattern of recognizing one or more items in the virtual environment, speed of actions performed by the user, time taken for each action and path followed in the virtual environment, or any combination thereof.

19. The VR device of claim 15, wherein the at least one processor calculates the predefined threshold score based on the historic data associated with behavior of the user.

20. The VR device of claim 15, wherein the at least one processor provides information regarding authentication to an external system.

\* \* \* \* \*

UNITED STATES PATENT AND TRADEMARK OFFICE
CERTIFICATE OF CORRECTION

| | | |
|---|---|---|
| PATENT NO. | : 12,277,202 B2 | Page 1 of 1 |
| APPLICATION NO. | : 17/763717 | |
| DATED | : April 15, 2025 | |
| INVENTOR(S) | : Mohit Sharma | |

It is certified that error appears in the above-identified patent and that said Letters Patent is hereby corrected as shown below:

On the Title Page

Item (86), Column 1, delete "PCT/US2019/053338" and insert -- PCT/US2019/059338 --

Signed and Sealed this
Tenth Day of June, 2025

Coke Morgan Stewart
*Acting Director of the United States Patent and Trademark Office*